(12) United States Patent
Benassi et al.

(10) Patent No.: US 8,161,833 B2
(45) Date of Patent: Apr. 24, 2012

(54) POWER TAKE-OFF FOR AN AGRICULTURAL VEHICLE

(75) Inventors: Giancarlo Benassi, Modena (IT); Ivan Tioli, Modena (IT)

(73) Assignee: CNH America LLC, New Holland, PA (US)

(*) Notice: Subject to any disclaimer, the term of this patent is extended or adjusted under 35 U.S.C. 154(b) by 1047 days.

(21) Appl. No.: 12/101,975

(22) Filed: Apr. 12, 2008

(65) Prior Publication Data

US 2008/0250885 A1 Oct. 16, 2008

(30) Foreign Application Priority Data

Apr. 13, 2007 (IT) .............................. TO2007A0260

(51) Int. Cl.
*F16H 37/00* (2006.01)
*F16H 63/32* (2006.01)
(52) U.S. Cl. ..................... 74/15.2; 74/15.84; 74/473.37
(58) Field of Classification Search ................... 74/15.2, 74/11, 15.4, 352, 15.6, 15.63, 15.66, 15.8, 74/15.82, 15.84, 15.86, 15.88, 473.36, 473.37
See application file for complete search history.

(56) References Cited

U.S. PATENT DOCUMENTS

| | | | | |
|---|---|---|---|---|
| 2,168,033 A * | 8/1939 | Johnston et al. | ............... | 74/15.2 |
| 2,618,979 A * | 11/1952 | Benning | .......................... | 74/15.4 |
| 2,636,390 A * | 4/1953 | Wagner | .......................... | 74/15.2 |
| 2,747,416 A * | 5/1956 | Swenson et al. | ............. | 74/15.84 |
| 2,932,202 A * | 4/1960 | Rinkema | ...................... | 74/15.86 |
| 3,147,643 A * | 9/1964 | Breting et al. | .................. | 475/59 |
| 3,219,164 A * | 11/1965 | Henyon | ..................... | 192/114 T |
| 3,248,969 A * | 5/1966 | Gasching | ........................ | 74/664 |
| 3,374,681 A * | 3/1968 | Hugh et al. | .................... | 74/15.66 |
| 3,464,277 A * | 9/1969 | Longshore | ..................... | 74/15.4 |
| 3,830,111 A * | 8/1974 | Travaglio | ....................... | 74/15.4 |
| 4,023,418 A * | 5/1977 | Zenker | ......................... | 74/15.86 |
| 4,938,085 A * | 7/1990 | Suzuki et al. | ................... | 74/15.2 |
| 5,245,892 A * | 9/1993 | Kim et al. | ................ | 74/665 GA |
| 5,974,907 A * | 11/1999 | Song | ............................... | 74/346 |
| 5,988,004 A * | 11/1999 | Hauser | ........................ | 74/15.63 |
| 6,314,827 B1 * | 11/2001 | Matsufuji | ....................... | 74/325 |
| 6,523,429 B2 * | 2/2003 | Desmarchelier et al. | ........ | 74/373 |
| 6,755,090 B2 * | 6/2004 | Ima | ................................. | 74/330 |
| 7,377,342 B2 * | 5/2008 | Miyazaki et al. | ............... | 180/62 |
| 7,409,887 B2 * | 8/2008 | Riegler et al. | .............. | 74/473.37 |
| 7,500,410 B2 * | 3/2009 | Tsuji | ............................... | 74/325 |
| 2002/0066324 A1 * | 6/2002 | Kanazawa | ...................... | 74/15.2 |
| 2005/0172740 A1 * | 8/2005 | Ebihara et al. | ................. | 74/15.4 |

\* cited by examiner

*Primary Examiner* — Thomas Will
*Assistant Examiner* — Abigail A Risic
(74) *Attorney, Agent, or Firm* — Sue C. Watson; Patrick Sheldrake

(57) ABSTRACT

A power take-off device for an agricultural vehicle, in particular a tractor, wherein an input shaft is connected to a first and, selectively, a second output shaft by moving a sleeve-type selector between three selection positions, in the first of which, the input shaft is connected angularly to the first output shaft to rotate the first output shaft at a first speed, and in the second and third of which, the input shaft is connected angularly to the second output shaft to rotate the second output shaft at a second speed and a third speed, different from the second speed.

16 Claims, 4 Drawing Sheets

POWER TAKE-OFF FOR AN AGRICULTURAL VEHICLE

FIELD OF THE INVENTION

The present invention relates to a power take-off device for an agricultural vehicle, in particular a tractor.

BACKGROUND OF THE INVENTION

In a common power take-off device, the input shaft is connected to the first and, selectively, the second shaft by two sleeves: a first sleeve is coaxial with the first shaft and movable axially between an operating position, in which the first shaft is connected to the input shaft to rotate at the first speed, and an idle position corresponding to an idle position of the first shaft; and the second sleeve is coaxial with the second shaft and movable axially between two operating positions, in which the second shaft is connected to the input shaft to rotate at the second and third speed respectively, and an intermediate idle position corresponding to an idle position of the second shaft.

Each sleeve can only be set to the respective operating position when the other sleeve is idle, and both sleeves are user-activated by means of respective control levers installed in the operator cab and connected to the respective sleeves by respective drives.

Though efficient and widely used, the above device has several drawbacks, mainly due to it being extremely complicated mechanically, and therefore complicated to produce and operate.

SUMMARY OF THE INVENTION

The present invention relates to a power take-off device of the type comprising a first and second output shaft; and a drive interposed between the two output shafts and an input shaft, and which comprises selection means for connecting the input shaft to the first and, selectively, the second output shaft. The drive is designed so that the input shaft, when connected to the first shaft, rotates the first shaft at a first angular speed, and, when connected to the second shaft, rotates the second shaft at a second and, selectively, a third angular speed differing from each other.

It is an object of the present invention to provide a farm vehicle power take-off device, in particular for a tractor, that is cheap and easy to produce and, at the same time, extremely easy to operate.

BRIEF DESCRIPTION OF THE DRAWINGS

The invention will now be described further, by way of example, with reference to the accompanying drawing, in which.

DETAILED DESCRIPTION OF THE PREFERRED EMBODIMENT

Figure 1:
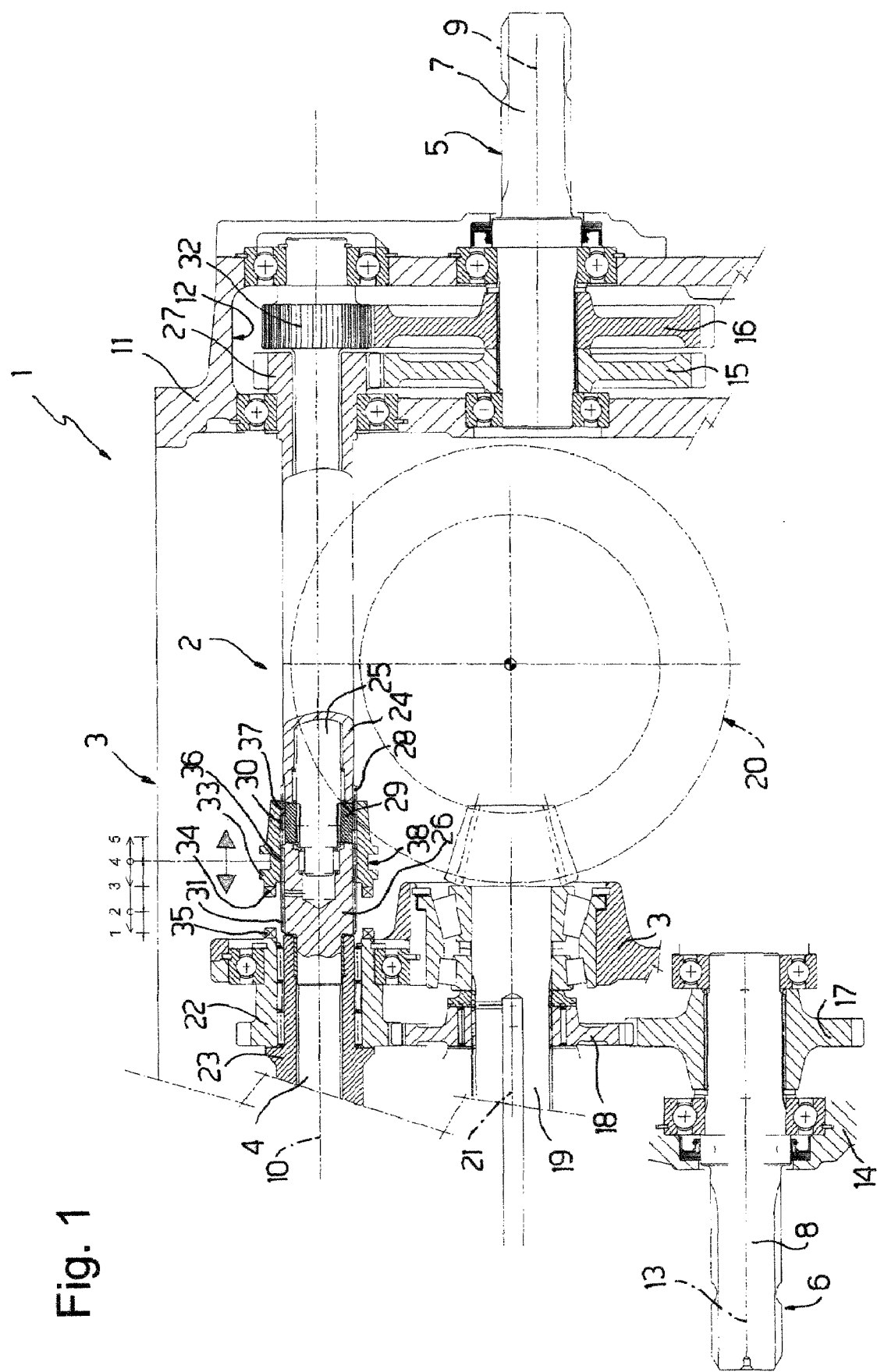
FIG. 1 shows a partial sectional view of a preferred embodiment of the power take-off device, with parts removed for clarity, according to the present invention.

The power take off device 1 for a farm vehicle comprises a drive 2, which is fitted to a frame 3 of the vehicle (not shown), the drive 2 is powered by an input shaft 4, normally a drive shaft (not shown), and transmits power selectively, to two output shafts 5 and 6. The two output shafts 5 and 6, which form part of device 1, are rotatably connected to frame 3, and have respective splined power take-off stubs 7 and 8, each of which projects outwards of the vehicle (not shown). The splined power take-off stubs 7 and 8 are connected angularly to a drive member (not shown), normally a universal joint, to transmit power to a machine or trailer.

Output shaft 5 has an axis 9 parallel to an axis of rotation 10 of input shaft 4, and is mounted for rotation through a hollow wall 11 of frame 3, defined by an inner wall and an outer wall parallel to each other and spaced apart to form a cavity 12.

Output shaft 6 has an axis 13 parallel to axis 9, and is mounted for rotation through a wall 14 (only shown partly in FIG. 1) of frame 3.

As shown in FIG. 1, drive 2 comprises two cylindrical gears 15 and 16 fitted to a portion of output shaft 5 inside cavity 12. Drive 2 further comprises a cylindrical gear 17 fitted to output shaft 6 and meshing with a cylindrical gear 18, which is rotatably connected to a shaft 19. In the example shown, the shaft 19 is an output shaft of a transmission 20 of the vehicle and is connected to frame 3 to rotate about an axis 21 parallel to axis 13. On its free end of the shaft 19, a bevel pinion is foreseen for meshing with a bevel gear of transmission 20.

In a variation not shown, as opposed to output shaft 19 of transmission 20, gear 18 may be fitted in rotary manner to a fixed support integral with frame 3 and having an axis parallel to axis 13.

Gear 18 in turn meshes with a gear 22, which, like gear 18, forms part of drive 2 and is rotatably connected to frame 3. Gear 22 is fitted into a hollow body 23 of frame 3 coaxial with axis 10, and houses input shaft 4 in a rotary manner.

Drive 2 also comprises two shafts 24 and 25 coaxial with each other and with axis 10, and interposed between hollow wall 11 and an end portion 26 of input shaft 4 projecting axially from hollow body 23.

Of the two shafts 24 and 25, shaft 24 is hollow and is substantially the same diameter as end portion 26 of input shaft 4. Hollow shaft 24 is mounted for rotation through the inner wall of hollow wall 11, and is fitted rigidly on its free end, inside cavity 12, with a gear 27 meshing with gear 15 fitted to output shaft 5.

As shown in FIG. 1 and in more detail in FIGS. 2-6, at the opposite end to that supporting gear 27, shaft 24 has external teeth 28 coaxial with axis 10 and of a pitch diameter equal to the diameter of shaft 24.

Shaft 25 is mounted for rotation inside shaft 24. At the end facing input shaft 4, shaft 25 has an end portion projecting axially from shaft 24 and inserted in rotary manner inside a cavity formed axially in the end portion of end portion 26 of input shaft 4.

In the gap between end portion 26 and shaft 24, shaft 25 is fitted with a toothed ring 29 coaxial with axis 10 and having external teeth 30 with the same pitch and pitch diameter as teeth 28, and as further teeth 31 carried on an end portion of end portion 26 and facing teeth 30.

At the opposite end to that fitted with toothed ring 29, an end portion of shaft 25 projects axially from shaft 24. This end portion is mounted for rotation, by means of a bearing, through the outer wall of hollow wall 11, and is fitted, inside cavity 12, with a gear 32 meshing with gear 16 fitted to output shaft 5.

As explained below, shafts 24 and 25 are connectable angularly to input shaft 4 to transmit power to output shaft 5.

Shafts 24 and 25 are selectively connected angularly to input shaft 4 by means of a selector defined by a sleeve 33, which is coaxial with axis 10. The sleeve 33 is fitted at least partly to end portion 26, and is movable axially between five selection positions, three of which are operating positions corresponding to rotation of stub 7 or 8, and two of which are intermediate idle positions between the three operating positions and corresponding to idle positions of both stub 7 and stub 8.

Figure 2:
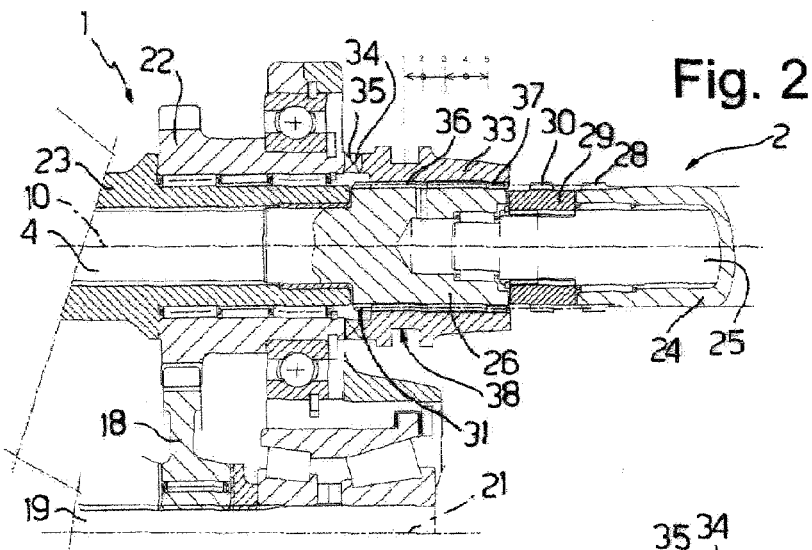
FIG. 2 shows a detail view of the power take-off device of FIG. 1, in a first operating positions.
Figure 6:
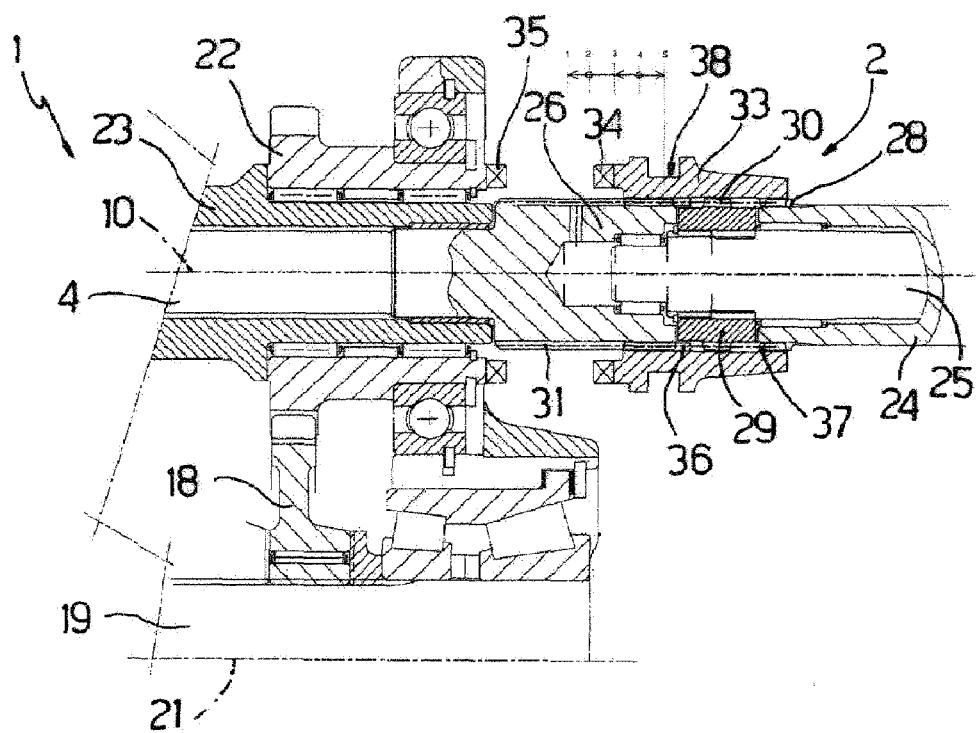
FIG. 6 shows a detail view of the power take-off device of FIG. 1, with the sleeve in a first operating position.
Figure 7:
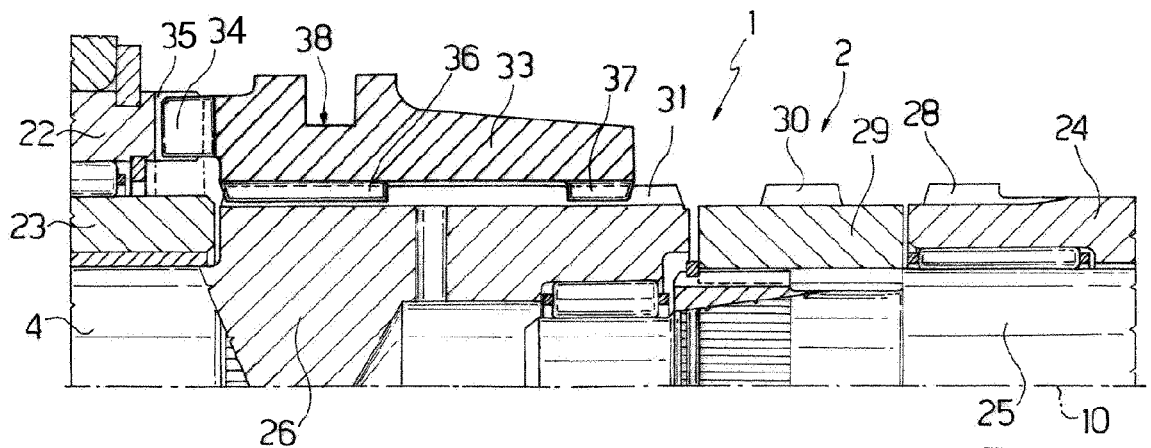
FIG. 7 shows a detail view of the power take-off device of FIG. 2, with the sleeve in a first operating position.

More specifically, in a first operating position sleeve 33 connects input shaft 4 to output shaft 6 to rotate stub 8 at an angular speed V1 of normally 2000 rpm, as shown in FIGS. 2 and 7. In the second operating position shown in FIGS. 4 and 8, sleeve 33 connects input shaft 4, by means of shaft 25, to output shaft 5 to rotate stub 7 at an angular speed V2 of normally 540 rpm. And, in the third operating position shown in FIGS. 6 and 9, sleeve 33 connects input shaft 4, by means of shaft 24, to output shaft 5 to rotate stub 7 at an angular speed V3 of normally 750 or 1000 rpm.

As shown in FIGS. 2-7, face teeth 34 are formed on the annular end surface of sleeve 33 facing hollow body 23, and mesh with like face teeth 35 formed on an annular end surface of gear 22 facing sleeve 33.

In addition to face teeth 34, sleeve 33 has internal teeth 36 close to face teeth 34, coaxial with axis 10, and meshing with teeth 31 of end portion 26. Sleeve 33 further has internal teeth 37 formed on the opposite axial end of sleeve 33 to teeth 36, and which mesh with teeth 30 of shaft 25 and, selectively, teeth 28 of shaft 24.

On its outer lateral surface, sleeve 33 has an annular groove 38 engaged, in use, by a known fork (not shown), which is connected by a drive (not shown) to a control lever (not shown) in the vehicle cab to move sleeve 33 between the five selection positions when the control lever is shifted by the operator.

In an embodiment not shown, axis 13 of output shaft 6 is substantially perpendicular to axis 10 of input shaft 4, so that stub 8 extends outwards of the vehicle in a direction crosswise to a longitudinal axis of the vehicle (not shown).

Operation of device 1 will now be described, as of the first operating position shown in FIGS. 2 and 7, in which stub 8 is rotated by input shaft 4, via drive 2, at angular speed V1.

In this position, sleeve 33 is positioned with face teeth 34 meshing with face teeth 35 of gear 22, and both teeth 36 and 37 meshing with teeth 31 of input shaft 4.

As a result, rotation is transmitted by sleeve 33 from input shaft 4 to gear 22, and from this, by gear 18, to gear 17 and, hence, output shaft 6.

The ratio between angular speed V1 and the angular speed of input shaft 4 therefore equals the gear ratio:

$$T_1 = (R_{22}/R_{17})$$

i.e. the ratio between the radii of gears 22 and 17.

Figure 3:
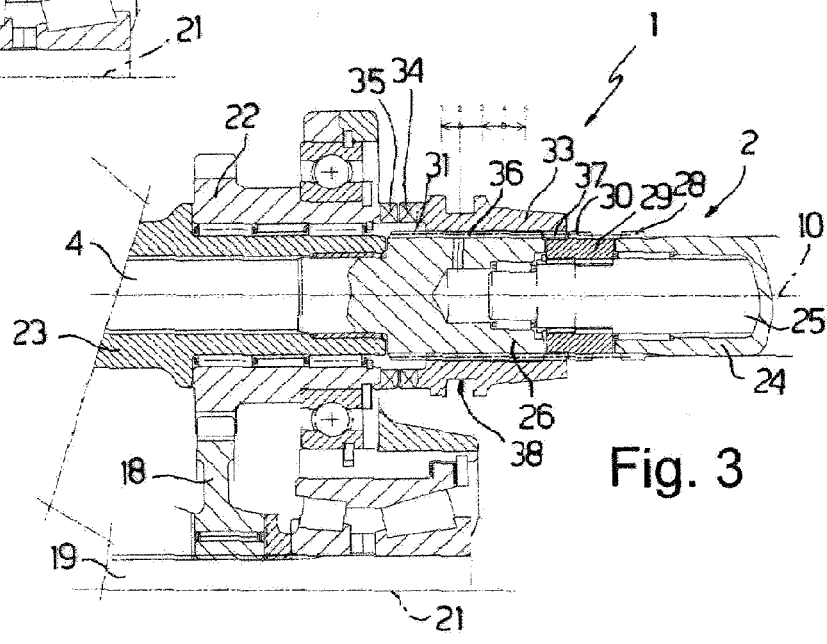
FIG. 3 shows a detail view of the power take-off device of FIG. 1, in a selection position correspondingly to an idle position of the stubs.

FIG. 3 shows the selection position immediately following the FIGS. 2 and 7 position and corresponding to an idle position of stubs 7 and 8. In this position, achieved from the position described above by moving sleeve 33 axially rightwards, teeth 36 and 37 still mesh with teeth 31 of input shaft 4, but, because face teeth 34 no longer mesh with face teeth 35, and despite sleeve 33 rotating at the angular speed of input shaft 4, rotation of sleeve 33 is transmitted to neither gear 22 nor either one of shafts 25 and 24.

Figure 4:
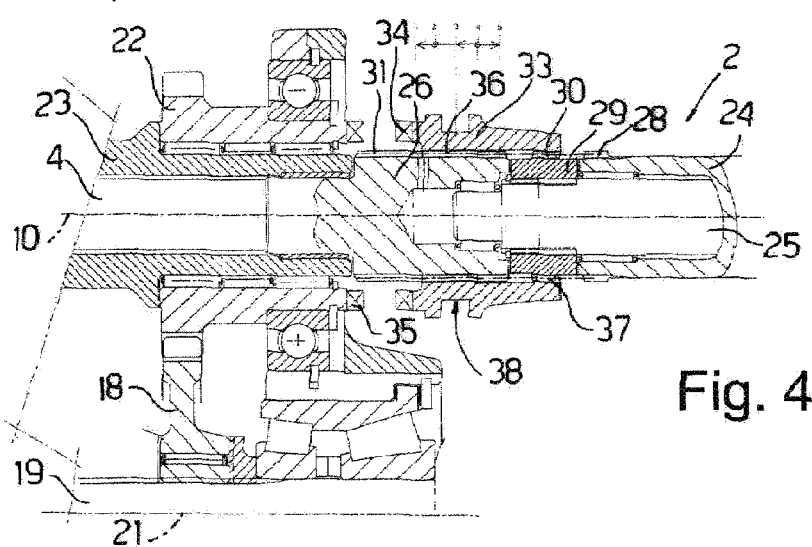
FIG. 4 shows a detail view of the power take-off device of FIG. 1, with the sleeve in a second operating position.
Figure 8:
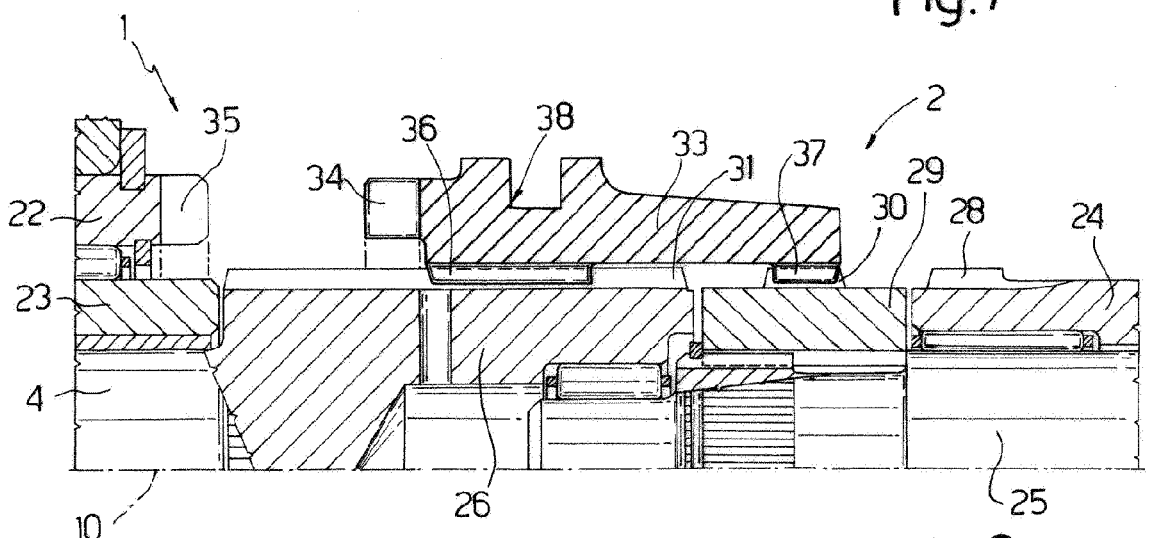
FIG. 8 shows a detail view of the power take-off device of FIG. 4, with the sleeve in a second operating position.

When moved further rightwards, sleeve 33 moves into the second operating position shown in FIGS. 4 and 8, and in which output shaft 5 is connected angularly to input shaft 4 by shaft 25, and stub 7 rotates at speed V2. In this position, teeth 36 of sleeve 33 mesh with teeth 31 of input shaft 4, and teeth 37 mesh with teeth 30 of shaft 25, so that power is transmitted by sleeve 33 from input shaft 4 to shaft 25, and from this to output shaft 5 by gears 32 and 16.

The ratio between angular speed V2 and the angular speed of input shaft 4 therefore equals the gear ratio:

$$T_2 = (R_{32}/R_{16})$$

i.e. the ratio between the radii of gears 32 and 16.

Figure 5:
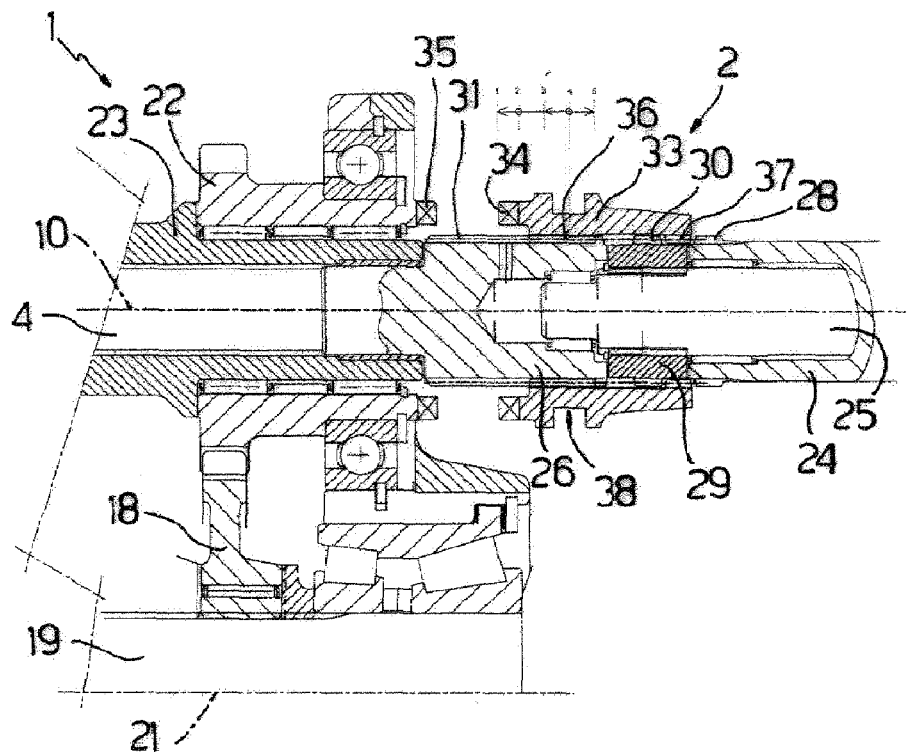
FIG. 5 shows a detail view of the power take-off device of FIG. 1, with the sleeve in a second selection position.

FIG. 5 shows the preceding selection position, which corresponds to a further idle position of stubs 7 and 8. More specifically, in this position, achieved by moving sleeve 33 axially further to the right, teeth 36 still mesh with teeth 31 of input shaft 4, but, because teeth 37 are interposed between and do not mesh with either teeth 30 of shaft 25 or teeth 28 of shaft 24, and despite sleeve 33 rotating at the angular speed of input shaft 4, rotation of sleeve 33 is transmitted to neither shaft 25 nor shaft 24.

Figure 9:
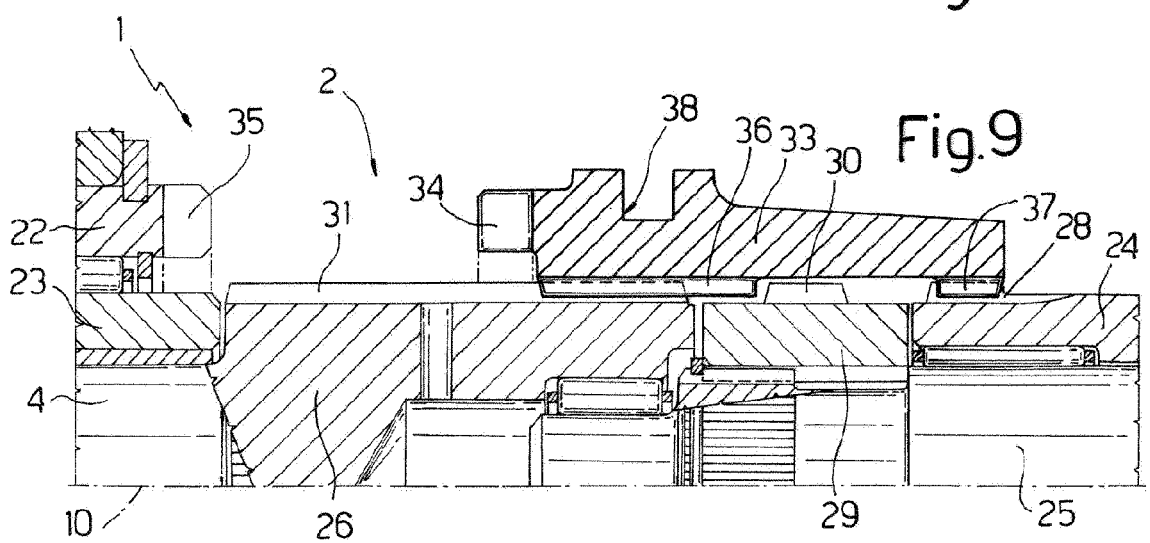
FIG. 9 shows a detail view of the power take-off device of FIG. 6, with the sleeve in a third operating position.

As shown in FIGS. 6 and 9, when moved further rightwards, sleeve 33 moves into the third operating position, in which output shaft 5 is connected angularly to input shaft 4 by shaft 24, and stub 7 rotates at speed V3. In this position, teeth 36 of sleeve 33 mesh with teeth 31 of input shaft 4, and teeth 37 mesh with teeth 28 of shaft 24, so that power is transmitted by sleeve 33 from input shaft 4 to shaft 24, and from this to output shaft 5 by gears 27 and 15. The ratio between angular speed V3 and the angular speed of input shaft 4 therefore equals the gear ratio:

$$T_3 = (R_{27}/R_{15})$$

i.e. the ratio between the radii of gears 27 and 15.

The advantages of device 1 according to the present invention will be clear from the foregoing description.

That is, by means of a single selector defined by sleeve 33, device 1 provides for selecting which of output shafts 5 and 6 is to be powered; for disengaging both output shafts 5 and 6; and for selecting angular speed V2 or V3 of stub 7.

Since using only one sleeve means only one actuating fork and, hence, only one control lever required, the operator controls are much more straightforward and easier to use.

Moreover, by transmitting power by means of coaxial shafts 24 and 25, sleeve 33 can be distanced from output shaft 5 and so located more centrally on the vehicle and closer to the operator cab, thus reducing and simplifying the drive interposed between sleeve 33 and the control lever in the cab, with obvious advantages in terms of reliability and manufacturing cost.

What is claimed is:

1. A power take-off device for an agricultural vehicle, the device comprising:
    a first and second output shaft;
    a drive interposed between the two output shafts; and
    an input shaft ;

the drive including a hollow shaft and an inner shaft free to rotate inside the hollow shaft, wherein the hollow shaft and the inner shaft are coaxial with each other and with the input shaft, the drive comprising a single selector for operably connecting the input shaft to the first and, selectively, the second output shaft via engagement of a portion of a surface of the selector which engages a portion of the input shaft and a selected one of (a) a portion of a gear operably connected to the first output shaft, or (b) a portion of a surface of one coaxial shaft which engages one gear operably connected to the second output shaft, wherein the input shaft, when connected to the first output shaft, rotates the first output shaft at a first angular speed, and, when connected to the second output shaft, rotates the second output shaft at a second or third angular speed, and wherein the selector is movable between a first, second and third different selection position, the first selection position in which the first output shaft is connected to the input shaft to rotate at the first angular speed, and the second and third selection position in which the second output shaft is connected to the input shaft to rotate at the second and third angular speed, respectively.

2. A power take-off device as claimed in claim 1, wherein the selector can be set to two further intermediate selection positions, a first intermediate selection position between the first and second selection positions, and a second intermediate selection position between the second and third selection positions, each of the first and the second intermediate selection positions corresponding to idle positions of both the first and second output shaft.

3. A power take-off device as claimed in claim 1, wherein in the second selection position, the selector operably connects the input shaft to the second output shaft via engagement of a portion of a surface of the selector which engages a portion of the input shaft and a portion of a surface of the hollow shaft which engages one gear operably connected to the second output shaft, and wherein in the third selection position, the selector operably connects the input shaft to the second output shaft via engagement of a portion of a surface of the selector which engages a portion of the input shaft and a portion of a surface of the inner shaft which engages one gear operably connected to the second output shaft.

4. A power take-off device as claimed in claim 1, wherein the hollow shaft has external teeth on the end facing the input shaft, and is fitted at the opposite end with a first gear meshing with a second gear fitted to the second output shaft.

5. A power take-off device as claimed in claim 4, wherein, at one end projecting axially from the hollow shaft towards the input shaft, the inner shaft has external teeth identical to the teeth of the hollow shaft, and is fitted, at the opposite end, with a third gear meshing with a fourth gear fitted to the second output shaft.

6. A power take-off device as claimed in claim 5, wherein an end portion of the input shaft facing the hollow shaft and the inner shaft has respective external teeth.

7. A power take-off device as claimed in claim 1, wherein the selector is a sleeve.

8. A power take-off device as claimed in claim 1, wherein the selector is coaxial with the input shaft, and is movable axially between the first selection position, in which the selector engages the input shaft and a gear, the second selection position, in which the selector connects the input shaft angularly to the hollow shaft, and the third selection position, in which the selector connects the input shaft angularly to the inner shaft.

9. A power take-off device as claimed in claim 8, wherein the selector has first internal teeth meshing with the teeth of the input shaft, and second internal teeth which, in the second selection position, mesh with teeth of the hollow shaft, and, in the third selection position, mesh with teeth of the internal shaft.

10. A power take-off device as claimed in claim 9, wherein the drive comprises a fifth gear, which has face teeth coaxial with the input shaft and facing the selector, and is connected angularly to a sixth gear fitted to the first output shaft, and wherein the selector has face teeth which mesh with the face teeth of the fifth gear when the selector is in the first selection position and first and second internal teeth of the selector mesh with teeth of the input shaft.

11. A power take-off device as claimed in claim 10, wherein the fifth gear is connected angularly to the sixth gear via a seventh gear interposed between them.

12. A power take-off device as claimed in claim 1, wherein the selector is located centrally on the agricultural vehicle.

13. A power take-off device as claimed in claim 1, wherein axis of the first output shaft is substantially perpendicular to axis of the input shaft .

14. A power take-off device as claimed in claim 1, wherein the first angular speed is higher than the second and third angular speed.

15. A power take-off device as claimed in claim 14, wherein the third angular speed is higher than the second angular speed.

16. A power take-off device as claimed in claim 14, wherein the first angular speed is about 2000 rpm, the second angular speed is about 540 rpm, and the third angular speed is about 750 or 1000 rpm.

* * * * *